United States Patent

Hansen, Jr. et al.

[11] 3,715,822
[45] Feb. 13, 1973

[54] DISPLAY SYSTEM

[75] Inventors: Lindsey B. Hansen, Jr., Ogden; Val D. Hyer, Sunset, both of Utah

[73] Assignee: Control Graphics Company, Ogden, Utah

[22] Filed: Nov. 16, 1970

[21] Appl. No.: 89,748

[52] U.S. Cl............................40/130 K, 40/106.52
[51] Int. Cl..................................G09f 13/18
[58] Field of Search..........................40/106.52, 130 K, 106.53, 130 L; 340/380

[56] References Cited

UNITED STATES PATENTS

| | | | |
|---|---|---|---|
| 3,562,746 | 2/1971 | Aron | 340/380 |
| 2,728,258 | 12/1955 | Stegner | 40/130 L |
| 1,872,155 | 8/1932 | Masek | 40/130 L |
| 1,973,480 | 9/1934 | Hall | 40/130 L X |
| 3,590,508 | 7/1971 | Jones et al. | 40/132 D |
| 2,507,909 | 5/1950 | Kaysen | 40/130 K |
| 2,263,281 | 11/1941 | Von Tadden | 40/130 K X |
| 3,467,960 | 9/1969 | Hosker | 340/380 X |
| 2,468,045 | 4/1949 | Deloraine | 340/380 |
| 3,184,872 | 5/1965 | Way | 40/106.53 |

FOREIGN PATENTS OR APPLICATIONS

| | | | |
|---|---|---|---|
| 698,785 | 10/1953 | Great Britain | 40/106.1 |

*Primary Examiner*—Robert W. Michell
*Assistant Examiner*—Richard Carter
*Attorney*—C. Harvey Gold, David V. Trask and William S. Britt

[57] ABSTRACT

A display system which includes a plurality of separately activated light sources, a plurality of light guides coacting with each light source such that one end of each light guide is juxtaposed with a light source and the opposite end of each light guide is positioned in a display face such that the opposite ends of the guides are lighted according to a predetermined program when the light sources are activated. The light sources are programmed and the light guides are arranged in the display face to simulate light movement over the display face when the display system is operated.

10 Claims, 4 Drawing Figures

PATENTED FEB 13 1973 3,715,822

INVENTOR.
Lindsey B. Hansen Jr.
BY and Val D. Hyer

C. Harry Held
Their Attorney

DISPLAY SYSTEM

BACKGROUND OF THE INVENTION

It is often desirable to provide an illuminated representation of a particular pattern which moves in a predetermined fashion. Accordingly display systems have been developed including lighting pattern similators. For example, U.S. Pat. No. 3,184,872 relates to apparatus for similating moving patterns and more particularly, a similating apparatus providing a lighting arrangement which is controlled so as to similate a moving object or a changing light pattern. The apparatus disclosed in the patent comprises a light source with a bundle of light fibers or guides positioned near the source. A rotating wheel is interposed between the source and the light directing means which is programmed to allow light to pass through ports in the wheel to one end of the fiber bundle. While the device disclosed in the patent, and other similar devices now known, are useful for their intended purpose they are not designed to precisely activate and deactivate individual light guides such that they can be used to precisely display a desired moving pattern. Accordingly, it is the principal object of this invention to provide a new and improved display system using light guides individually activated to similate moving objects and patterns.

BRIEF DESCRIPTION OF THE INVENTION

In its broadest form the invention relates to a display system which comprises a plurality of separately activatable light sources; activation means for activating each said source; a plurality of light guides coacting with each separate light source such that one end of each light guide is juxtapositioned to a light source wherein the opposite end of each light guide is lighted when the light source adjacent to the one end of the light guide is activated; and display face means for positioning the opposite end of each light guide in a predetermined programmed relationship.

In another embodiment of the invention the number of light sources is represented by the letter Y and the number of light guides coacting with each light source is $Y^n$, wherein the letter $n$ is a whole number.

In still another embodiment of the invention the opposite ends of the light guides coacting with each of the light sources are positioned in said display face in a predetermined side by side series relationship.

In still yet another embodiment of the invention, program means alternatively activate and deactivate light sources to progressively light and darken the opposite guide ends in each of the light guide series to similate movement.

BRIEF DESCRIPTION OF THE DRAWINGS

So that the invention may be more readily described and understood, reference is made to the accompanying drawings which are offered by way of example only and are not to be taken as limiting the invention, the scope of which is defined by the appended claims which are intended to embrace equivalent structures.

DESCRIPTION OF THE PREFERRED EMBODIMENT

Figure 1:
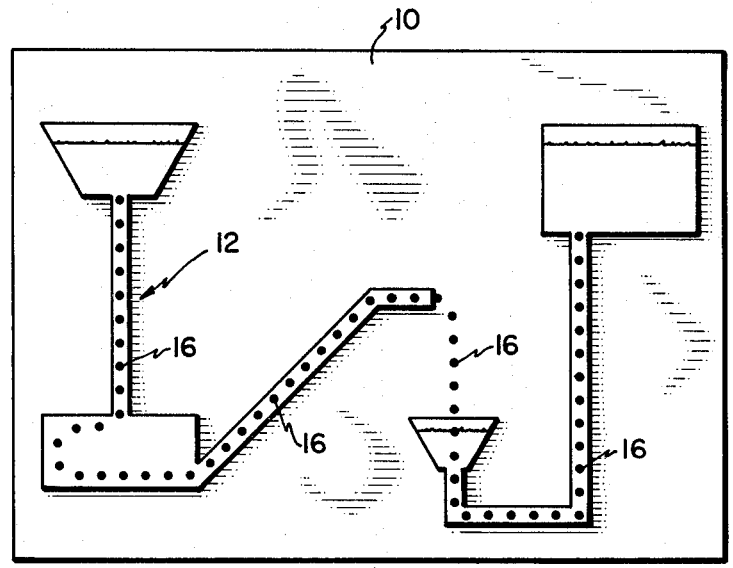
FIG. 1 is a plan elevation view of the face of a display panel fitted with the light movement control system of this invention.

Referring now more particularly to the drawings, there is shown a display panel 10 with a design 12 printed thereon of a predetermined flow process. The panel 10 is provided with a plurality of ports 14 sized to receive one end 16 of a light guide 18. As shown in FIG. 1, the light guides are preferably positioned to conform with the flow pattern of the process illustrated on the display panel and are used to similate product movement.

Figure 2:
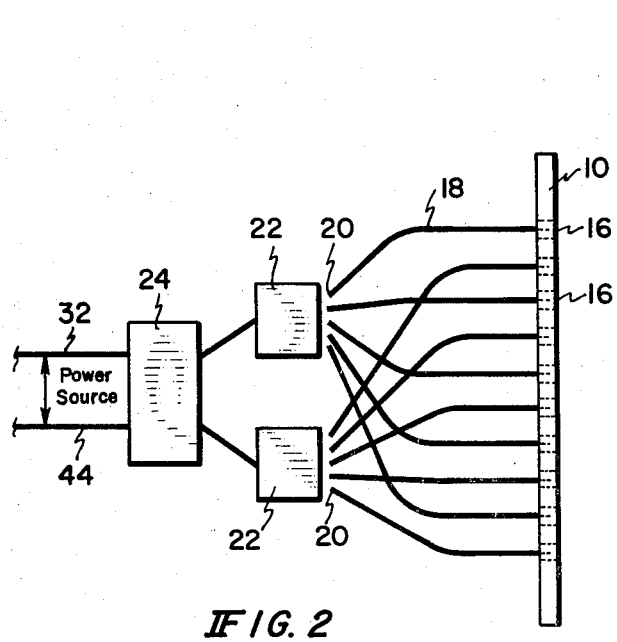
FIG. 2 is a block representation of the control system of this invention.

As shown in FIG. 2, the other end 20 of each light guide 18 is positioned proximate a light source 22 such that when the source is activated light is transmitted along the guide 18 to end 16 positioned within display panel 10. Inasmuch as a plurality of light sources 22 are used to activate the guides 18 the sources must be programmed to be lighted and then darkened according to a predetermined program. Switching means 24 electrically connected to a power source are used for this purpose. Switching means such as standard digital logic circuitry or mechanical switching devices of the type illustrated in FIGS. 3 and 4 can be used.

The light guides or optical fibers 18 of this invention are made of a highly transparent material which is preferably flexible in order to facilitate the construction and arrangement of the display contemplated. Clear plastic such as Lucite and Plexiglas are suitable for this purpose but if a permanent installation is contemplated, the guides may be made of rigid transparent material such as glass. To prevent loss of light, the guides must have a higher reflective index than the surrounding medium. Where the guides come into contact with each other as, for example, when guide rows are tightly positioned within panel 10 or end guides 20 are tightly packed for positioning against a light source 22 it is desirable to coat the outside surface of the guides with a layer of material having a lower refractive index or with an opaque refractive material to prevent leakage between illuminated and non-illuminated guide elements. The guides may be of various sizes depending on the size and use of the display device in which they are installed. Generally, they will range from about 0.01 inch to 0.5 inch in diameter. The ends 16 of the guides 18 may project a short distance out from the surface of the panel 10 so as to be visible from all angles or they may be flush with or slightly recessed into the surface to provide a limited angle of viewing. In many instances, frictional engagement of the fiber element with the panel 10 will be sufficient to hold the ends in place in the openings 14 but in some cases it may be desirable to attach the ends 16 within ports 14 with a suitable clip, fastener or with glue.

Figure 3:
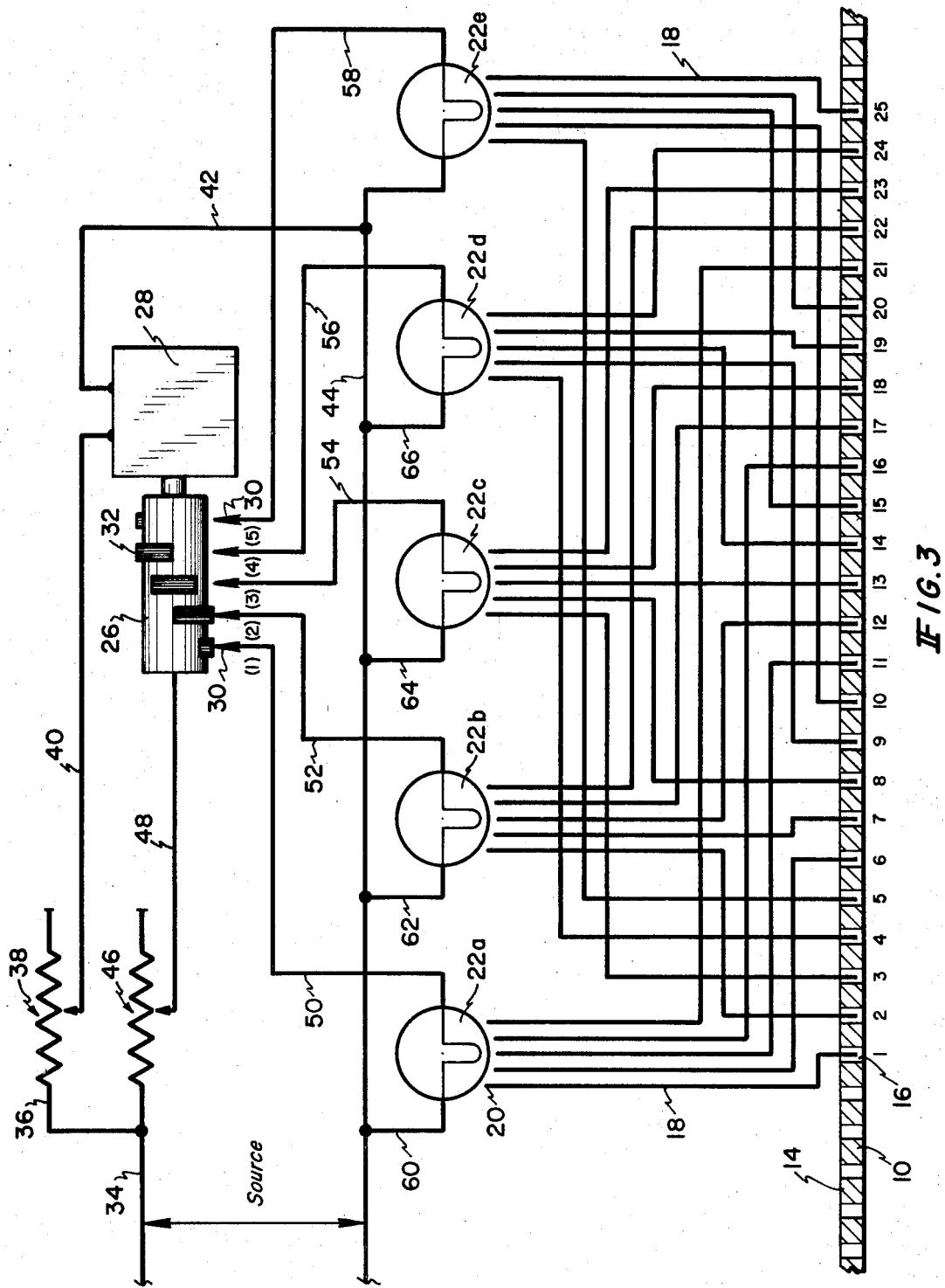
FIG. 3 is a schematic representation of a preferred control system of this invention.

As indicated, the ends 20 of guides 18 are illuminated by suitable light sources 22 such as conventional electric light bulbs. In the preferred embodiment of the invention the number of light sources can be represented by the letter Y and the number of light guides coacting with each separate light source is a whole number and most preferably, 1, e.g., when there are five light sources it is preferred that each light source activate five light guides. Also, in the preferred embodiment of the invention light guides coacting with each light source 22 are arranged in a series such that one guide from each source is placed in a side by side relationship and then the series is repeated by placing a second guide from each source in a similar side by side relationship. Accordingly, when a structure of the type illustrated in FIG. 3 is operated which uses five light sources 22 a, 22 b, 22 c, 22 d, and 22 e a first light guide 18 from each of the sources is positioned in a side by side relationship such that, for example, the guide from source 22 a is in a No. 1 position in panel 10, the guide from source 22 b is in the No. 2 position, the guide from source 22 c is in the No. 3 position, the guide from 22 d is in the No. 4 position, and the guide from source 22 e is in the No. 5 position. This series is then repeated with a second guide from each of the sources, a third guide, a fourth guide, and the fifth guide. Accordingly, five identical series of five light guides each are positioned in a side by side relationship along the face of display panel 10. When light source 22a is activated the ends 16 of guides 18 in the No. 1, 6, 11, 16 and 21 positions are activated. Similarly the ends 16 in positions 2, 7, 12, 17, and 22 are lighted when source 22 b is activated. By using a structure of this type herein described the lights in the combined five series, i.e., positions 1–25, can be made to appear to progressively move by alternately activating and deactivating sources 22 a, 22 b, 22 c, 22 d and 22 e respectively.

In order to produce the desired motion of the light pattern appearing on the front face of panel 10 the sequence of illumination of sources 22 is controlled according to a predetermined program. It has been found to be desirable to arrange the light guides in series consisting of five guides each and to maintain two side by side positioned guide ends 16 lighted to better show the desired light movement. Accordingly, when, for example, five light sources 22 are used with five coaction light guides each the sources can be programmed to maintain two side by side lights activated and three deactivated as will be hereinafter described in connection with the description of the program means.

Figure 4:
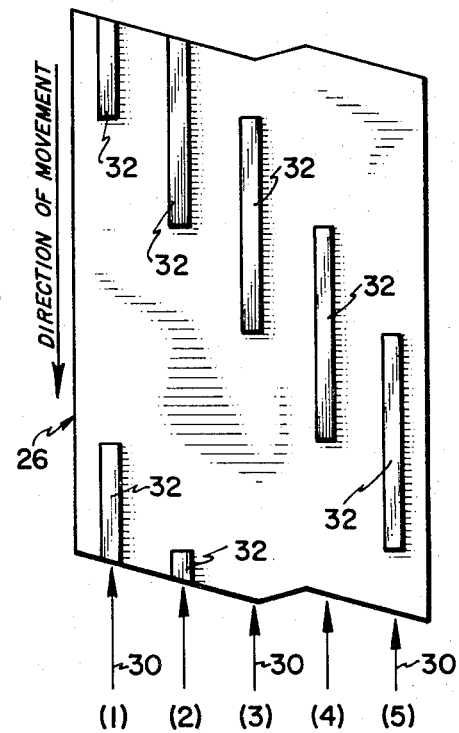
FIG. 4 is a plan view of the face of an activation switch programmed to activate light sources according to a preferred embodiment of the invention.

FIG. 3 illustrates an activation circuit including a mechanical contact switch 26 programmed to activate light sources 22 to maintain two light guides activated at all times. Switch 26 is a rotating switch driven with motor 28 such that contact points 30 form an electrical contact with programmed conductors 32 when the conductors are aligned with the contacts 30. FIG. 4 illustrates the positioning of conductors 32 to achieve light source activation of the type referred to herein. As shown in FIG. 4 conductors 32 are arranged such that contacts 32 are always in contact with at least two of the conductors. Accordingly, for example, when electrical contact is broken between the conductor 32 and contact 30(1) a new contact is made with conductor 32 and contact 30(4) while conductor 32 is simultaneously contacting contact 30(5).

As indicated, switch 26 is rotatably driven with variable speed motor 28. Motor 28 is powered with current which passes from a source along lines 34 and 36, through potentiometer 38, and from thence along line 40 to said motor 28. From motor 28 current passes along lines 42 and 44 to ground. The speed of motor 28 can, of course, be varied by adjusting potentiometer 38.

Switch 28 is connected to the power source with line 34, potentiometer 46 and line 48 which in turn is in electrical contact with each of the switching conductors 32. Current passes from a conductor 32 and a coacting contact 30 along lines 50, 52, 54, 56, and 58 to light sources 22 a, 22 b, 22 c, 22 d and 22 e respectively. The sources are in turn connected to ground line 44 with line 60, 62, 64 and 66. The intensity of the light sources 22 can be varied by adjusting potentiometer 46. As previously indicated, the programmed light source activation means herein described can be replaced with any equivalent activation circuitry such as a digital logic circuit.

In operation, a design is formed on a support panel 10 which conforms with a predetermined process, display or the like. A plurality of side by side positioned ports 14 are then formed in the panel to conform with flow patterns or displays desired to be illuminated. One end 16 of light guides 18 are then positioned in each of the ports and the other end 20 of the guides are juxtapositioned to a light source 22 attached to the back side of the panel 10. As previously described the light guides coacting with each light source 22 are arranged in series so that one guide from each source is positioned in a side by side relationship and then the series is repeated. The light sources are electrically connected with programmed activation means suitable for activating the sources such that the ends 16 of guides 18 appear to be progressively activated along a line in each series of guides. Most preferably the activation means maintains the ends 16 of two guides simultaneously activated.

We claim:

1. A display system which comprises
   a. A plurality of separately activatable light sources,
   b. Sequential activation means electrically connected with each of said light sources for sequentially activating said plurality of light sources,
   c. A plurality of fiber light guides coacting with each separate light source such that one end of each light guide is juxtapositioned to a light source wherein the opposite end of each fiber light guide is lighted when the light source with which the one end of said fiber light guide coacts is activated, wherein the end of each fiber light guide opposite from the light source is spaced from adjacent fiber light guide ends, wherein adjacent fiber light guides at said opposite ends coact with different light sources, and wherein said plurality of fiber light guides at said opposite ends are arranged in a series such that one guide from each source is placed in a side-by-side relationship and the series repeated by placing a second guide from each source in a similar side-by-side relationship.
   d. And display face means for positioning the opposite end of each fiber light guide in a spaced, predetermined programmed relationship.

2. The display device of claim 1 wherein a first light source illuminates the first fiber light guide in each series of fiber light guides.

3. The display system of claim 1 wherein said activation means includes program means for alternatively activating and deactivating each light source.

4. The display system of claim 1 wherein the number of light sources is represented by the letter Y and the number of light guides coacting with each separate light source in $Y^n$ wherein the letter n is a whole number.

5. The display system of claim 4 wherein Y equals five and $n$ equals one.

6. The display system of claim 4 wherein said activation means includes dimmer means for controlling the intensity of said light sources.

7. The display system of claim 1 wherein said activation means includes program means for activating and deactivating each light source such that the opposite ends of said light guides positioned in each said side by side series relationship are progressively activated and deactivated from one end of said series to the other end of said series.

8. The display system of claim 7 wherein said activation means includes means for varying the rate at which said light sources are activated and deactivated.

9. The display system of claim 7, wherein said program means simultaneously maintains a plurality of light sources activated to light a plurality of adjacently positioned opposite ends of said light guides in each said series.

10. The display system of claim 9 wherein two light sources are maintained activated.

* * * * *